Patented Sept. 15, 1953

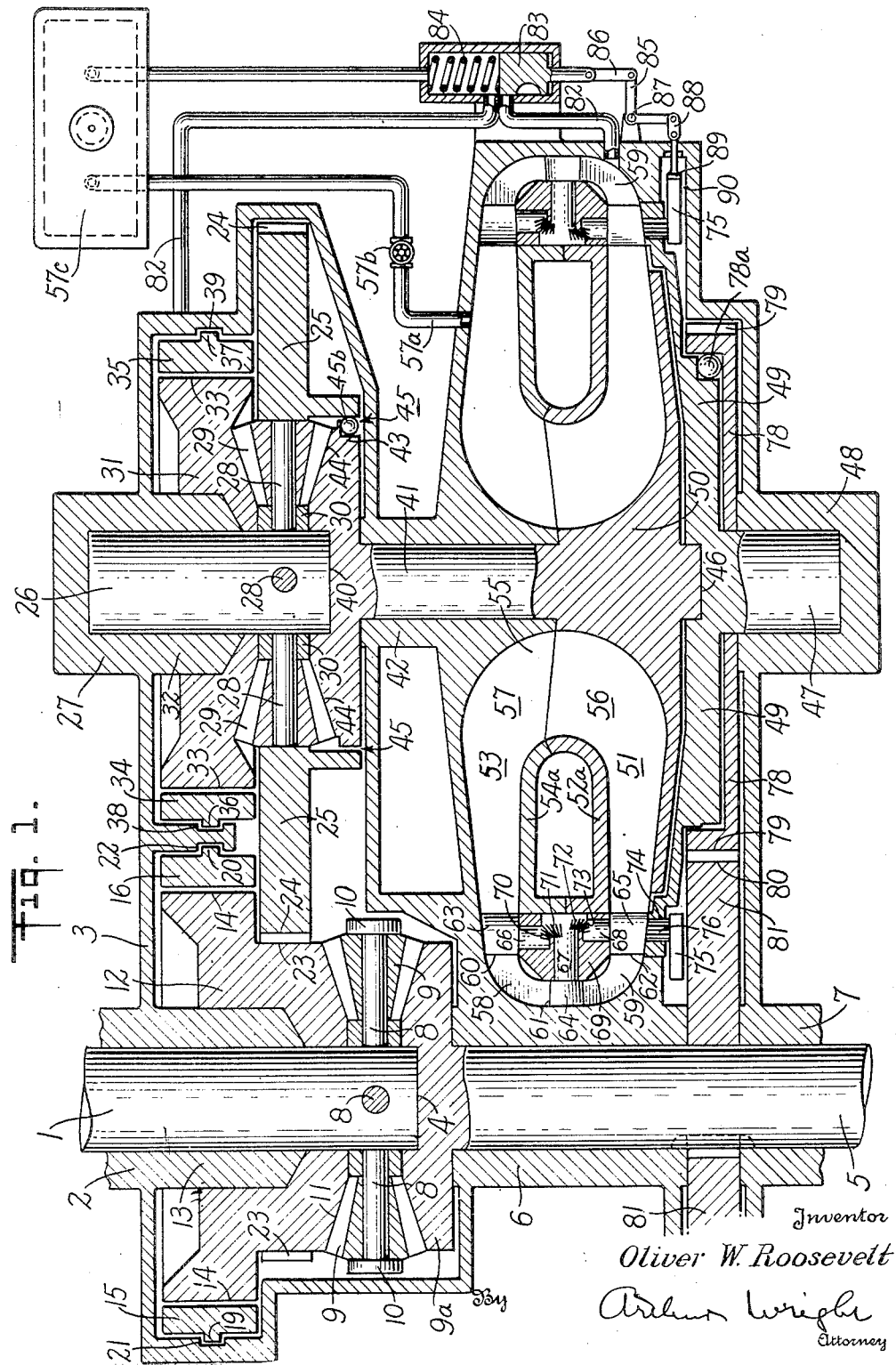

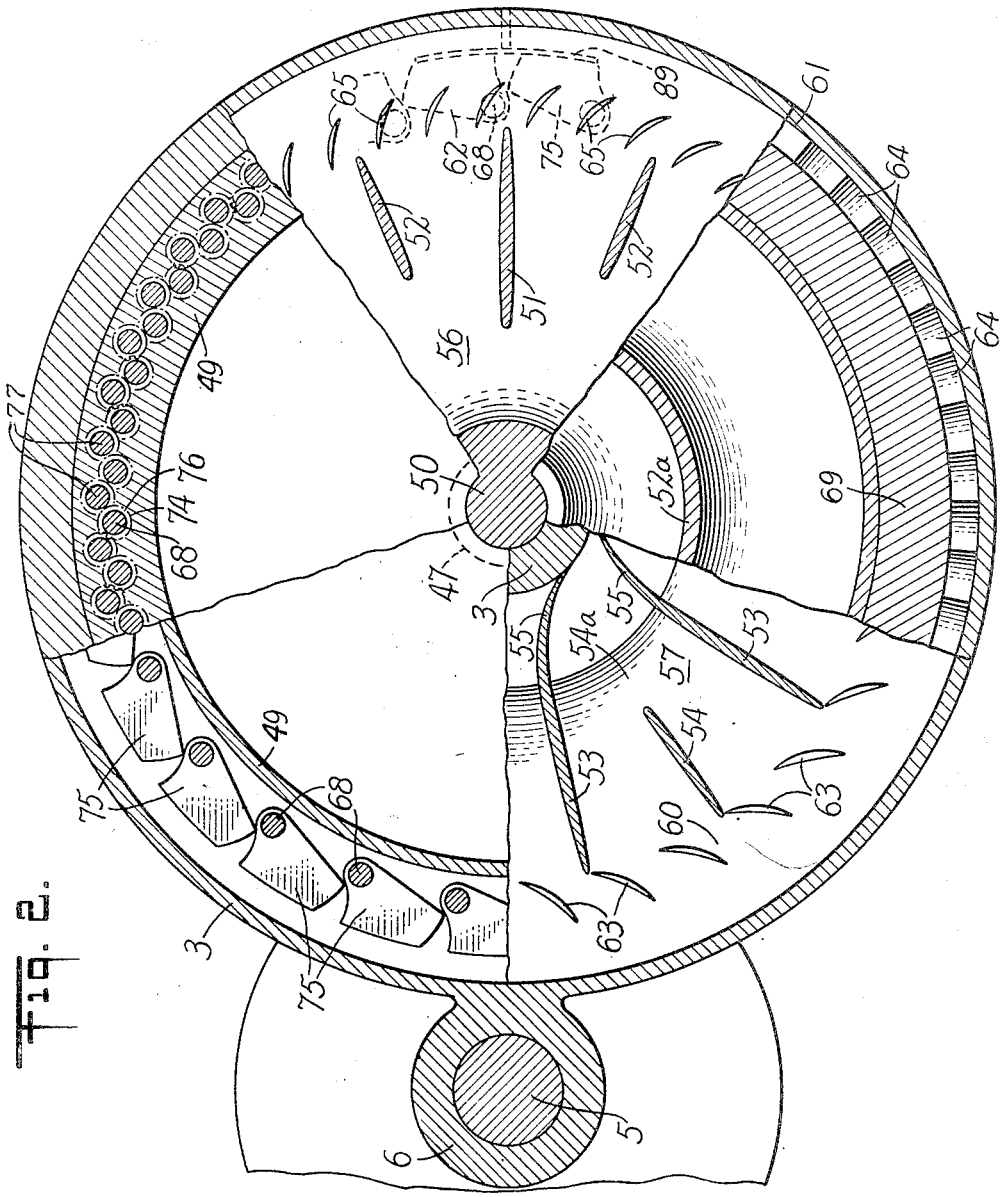

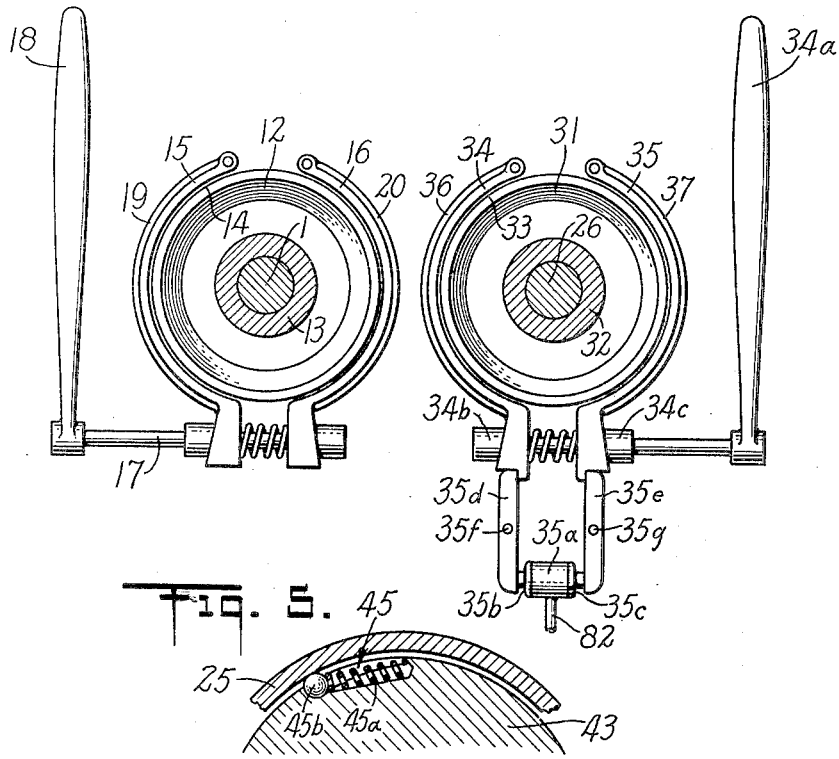

2,651,920

UNITED STATES PATENT OFFICE 2,651,920

ROTARY TURBINE TYPE TORQUE CONVERTER FOR VARYING SPEED RATIOS

Oliver W. Roosevelt, New York, N. Y.

Original application January 20, 1945, Serial No. 573,740, now Patent No. 2,551,396, dated May 1, 1951. Divided and this application May 31, 1946, Serial No. 673,481

8 Claims. (Cl. 60—54)

My invention relates particularly to a torque converter adapted to be used for any desired purpose, but which is especially applicable in connection with transmissions, as, for instance, on automotive vehicles such as taxicabs, buses, trucks, rail cars and locomotives.

This application is a division of my copending application upon Power Diversion Transmission, Ser. No. 573,740, filed January 20, 1945, now Patent No. 2,551,396, issued May 1, 1951.

The object of my invention is to provide a torque converter, by means of which various speed ratios may be obtained. Another object is to provide an apparatus of this character which is adapted to be used in connection with transmissions involving a hydraulic impeller. A further object is to provide in this connection, rotatable adjustable runner blades controlled by the speed of operation. Another object is to provide virtually universal gear ratios permitting shock-free acceleration. Another object is to provide means for starting a motor vehicle using the minimum required engine power under any conditions of road or grade. Another object is to eliminate unnecessary engine strains due to forcing the operation of the motor at too low a gear ratio. Still another object is to eliminate shocks and wear, as well as loss in efficiency, when changing the gear ratios. Accordingly, my invention is designed to provide greater operating efficiency and longer life of the engine, chassis, body and tires of automobiles. This is of great importance, especially in connection with the operation of taxicabs, buses, light and heavy trucks, etc. Still another object is to provide means for altering or automatically changing the gear ratios and, when desired, to eliminate the automatic gear ratio changing mechanism and provide a direct drive. Further objects of my invention will appear from the detailed description of the same hereinafter.

While my invention is capable of embodiment in many different forms, for the purpose of illustration I have shown only one form thereof in the accompanying drawings, in which—

Fig. 1 is a diagrammatic plan view of a power diversion transmission made in accordance with my invention;

Fig. 2 is a transverse section of the same taken on several different planes;

Fig. 3 is a vertical section of the same showing a part of the runner;

Fig. 4 is an elevation of the clutch shoes and operating levers forming a part of the gear ratio changing transmission;

Fig. 5 is a vertical section of one of the free wheeling or ratchet device used in connection with my invention; and Fig. 6 is a similar section of another free wheeling or ratchet connection in the transmission made in accordance with my invention.

In the drawings I have shown a driving shaft 1 which may be connected to or form a part of any desired motor, as for example an integral combustion motor, mounted on a vehicle, such for instance as a taxicab or bus, the same being carried in any suitable bearings 2 forming part of a transmission housing 3. The inner end of the shaft 1 is also supported for relative rotation in a recess 4 in a driven shaft 5, the said shaft 5 being connected to drive the vehicle by the usual manually operated synchro-mesh gear engagement for direct drive, plus a reverse gear, and universal joint (not shown) which may be constructed in the usual manner. The shaft 5 is carried in bearings 6 and 7 forming a part of the transmission housing 3. On the shaft 1, furthermore, there are mounted, for rotation therewith, a plurality of radial shafts 8, each of which carries a conical satellite gear 9 spaced away from the shaft, and which is maintained in place by a disc member 10 secured to the shaft 8. The conical satellite gears 9 on one side mesh with a gear face 11 of an annular power-diversion gear 12 rotatable on the shaft 1 and which is supported by a bearing 13 forming a part of the transmission housing 3, and on the other side mesh with a gear 9a fast on the shaft 5. The said gear 12, furthermore, has a cylindrical periphery 14 acting as a friction brake, with pivoted brake shoes 15 and 16, the lower ends of which can be forced together by means of a rotatable cam shaft 17, or any other usual means, operated by a hand lever 18. It will be noted that the brake shoes 15 and 16 have guide ribs 19 and 20, respectively, which cooperate, respectively, with recesses 21 and 22 carried by the walls of the transmission housing 3.

The gear 12, furthermore, has a gear face 23 which meshes with a gear face 24 of a gear 25 tightly secured to a shaft 26 carried by bearings 27 in the housing 3, the said gear 25 being connected by means of a series of subsidiary gear shafts 28 to said shaft 26. The said subsidiary gear shafts 28, furthermore, carry conical gears 29 thereon which are spaced away from the shaft 26. The said conical gears 29, also, mesh with an annular floating gear 31 rotatably carried by the shaft 26 and supported in a bearing 32 on the said housing 3. The outer periphery of the floating gear 31 has a friction face 33 to cooperate with a pair of pivoted brake shoes 34 and 35, having guide ribs 36 and 37 carried in recesses 38 and 39 in the housing 3. The brake shoes 34 and 35 can be brought into and out of engagement to any desired extent with the friction face 33 by means of a hand lever 34a which operates cams 34b and 34c to bring the brake shoes 34 and 35 together to any desired extent. However, they may be brought together, also, automatically by a hydraulic cylinder 35a having pistons 35b and 35c bearing on levers 35d and 35e, on fixed pivots 35f and 35g, which bear on the brake shoes 34 and 35.

The said shaft 26, at its inner end, is rotatably carried in a recess 40 in a shaft 41 which is supported in a bearing 42 in the said housing. The said shaft 41, furthermore, has a bevelled gear 43 having a gear face 44 meshing with the gears 29. Adjacent to the said gear face 44, the gear 43 is, also, provided with a free wheeling connection 45 with the gear 25 by means of tapered ball recesses 45a having balls 45b therein in the usual way, so arranged that the gear 43 may travel faster than the gear 25, but so that the gear 43 must travel at least as fast as the gear 25.

The inner end of the shaft 41 is rotatably carried in a recess 46 in a shaft 47 supported in a bearing 48 in the said housing, to which shaft 47 there is secured a rotatable runner 49. On the periphery of the shaft 41 there is an impeller 50 having a series of impeller blades 51 and 52, all of said blades being arranged radially and connected together by a wall 52a, but the blades 52 being arranged to alternate with the blades 51 and being somewhat shorter than the blades 51, as shown in Fig. 2. The impeller blades 51 and 52 are arranged adjacent to a series of stationary guide blades 53 and 54 carried in a fixed position in the housing 3, which blades 53 and 54 are also arranged radially and are connected together by a wall 54a, the blades 53 having inner curved ends 55 which extend down to a point near the shaft 41. In this way chambers 56 are formed by the blades 51 and 52, which communicate with chambers 57 between the blades 53 and 54 to form a circulation space which may be preliminarily filled with any desired liquid, as for example an oil or hydraulic brake fluid. The chambers 56 and 57 can be kept supplied with this fluid through a pipe 57a, having a normally open pet cock 57b, leading from a vented reservoir 57c. The housing 3, furthermore, has two series of stationary, radially-arranged, guide blades 58 and 59, having annular spaces 60, 61 and 62 for three series of runner blades 63, 64 and 65, respectively, which are supported by stud shafts 66, 67 and 68 located in a floating ring 69. Each shaft 66 has several conical gear teeth 70 which mesh with a similar set of conical gear teeth 71 which are on a shaft 67. Furthermore, on each shaft 67 there are a number of conical gear teeth 72 which will mesh with a similar number of conical gear teeth 73 on a shaft 68. Each said shaft 68 is journalled in sockets 74 in the runner 49, and the ends of the alternate shafts 68, which extend beyond the runner 49, are each provided with a centrifugal counterweight 75. Also, on each of the shafts 68 there are peripheral gear faces 76 which mesh with intermediate gears 77 located between the respective shafts 68, so that all of said centrifugal counterweights 75 will operate in unison (Fig. 2).

Journalled on the shaft 47, furthermore, there is rotatably carried an annular gear 78, and between the said gear 78 and the pehiphery of the runner 49 there is arranged a free wheeling connection in the form of a series of balls 78a and tapered sockets 78b, as shown in Fig. 6, so arranged that the gear 78 may rotate faster than the runner 49, but so that the speed of the runner 49 cannot exceed the speed of the gear 78. On its periphery, gear 78 has a gear face 79 which meshes with gear teeth 80 on the periphery of a gear 81 which is keyed to the shaft 5.

Also, the cylinder 35a is connected by a pipe 82 to a space between any two of the blades 59. See Fig. 1. In circuit with the said pipe 82 there is a plunger valve 83 normally seated in closed position by a spring 84, and which is connected to a bell crank lever 85 by a link 86, said lever 85 having a fixed pivot 87 and a link 88 connected to a plunger 89. The plunger 89 is carried in a chamber 90 adjacent to the counterweights 75, and is long enough, as shown in dotted lines in Fig. 2, to bridge across the outer faces of any two adjacent counterweights 75, so as to overlie simultaneously the outermost positions, when rotating, of at least two of said counterweights 75.

In the operation of the power diversion transmission made in accordance with my invention, it will be understood that the motor, when operating, will, accordingly, rotate the shaft 1. In starting the vehicle, the brake shoes 15 and 16 will be in released position with regard to the clutch surface 14. Also, the brake shoes 34 and 35 will be in released position before the motor is being started. The torque from the shaft 1 is transmitted through the satellite gears 9 and through the gears 9a and 12 simultaneously to the shaft 5 owing at least to the restraint exercised by the gearing and the impeller to which they are connected. When it is desired to transmit the driving force to the vehicle for moving the same, the synchro-mesh gear for direct drive (not shown) connected to the shaft 5, is thrown into engagement manually. At the idling speeds of the motor, this will tend, already, to produce some forward motion, inasmuch as the satellite gears 9 will be turning the gear 12 at double the number of R. P. M. of the shaft 1 using the gear 9a as a fulcrum. Likewise, as a result of the rotation of the gear 12, the gear 25 and the shaft 41 will revolve, but the gear ratio between the gear 12 and the gear 25 will produce very little power through the torque converter at the idling speeds of the motor. When the motor is accelerated, however, it transmits an effective torque to the shaft 5, through the gear 9a and the runner 49 as well as the gear 78, owing to the force of the circulating liquid in the chambers 56 and 57, which reacts against the fixed guide blades 53, 54, 58 and 59 through the intervention of the movable blades 60, 61 and 62. When the vehicle is adequately in motion to meet the existing conditions, the brake lever 34a is preferably operated to slow down the floating gear 31 to the desired degree, so as to bring it to a stop, thus doubling the speed of the shaft 41 relative to the gear 25. The setting of the brake shoes 34 and 35 can be chosen or predetermined in any desired way, either manually by the lever 34a or so as to bring the brake into action automatically, to the desired extent, by any suitable mechanism, as, for instance, according to the increase of speed of the runner 49, because of the counterweights 75 pushing on the plunger 89 to open the communication of the valve 83 with the pipe 82. Normally, when the mechanism is at rest the counterweights 75 will have been returned to their initial position by the spring 84. The greater the speed of the runner 49 the more the valve 83 is opened, thereby exerting hydraulic pressure to tighten the brake shoes 34, 35. The brake shoes 34 and 35 can be placed in a set position manually so as to retain the gear 31 at rest, under one set of road conditions, or they can be moved into said position automatically by the pressure from the pipe 82. It will be understood that with the increase of speed of the runner 49 the counterweights 75 will be moved outwardly. The brake shoes 34 and 35 can be released by the hand lever 34a before the vehicle is being started again or when unusual grade or other road conditions make it desirable to do so. As the shaft 5 acquires an increasing R. P. M., the counterweights 75 tend to move the movable blades 60, 61 and 62 toward closed positions, so as to increase the R. P. M. of the runner 49 and the shaft 5, or to require relatively fewer R. P. M. of the annular gear 12, thus providing for fewer revolutions of the driving shaft 1 as compared with the driven shaft 5. Also, as the speed of the runner 49 increases the centrifugal weights 75 will tend to move outwardly to move the plunger 89 and the brake shoes 34 and 35 will be tightened hydraulically from the action of the liquid in the pipe 35b. In this way, each additional acceleration of the motor serves to increase the R. P. M. of the driven shaft 5 as compared with the engine speed, and I have provided, thus, a flexible and constantly variable ratio of engine speed to the speed of the vehicle, varying from a low speed with a high torque to a high speed with a low torque. Under the conditions of operation, furthermore, the gear 12 may revolve more slowly than the codriven shaft 5. When this has taken place to a sufficient extent, if desired the brake shoes 15 and 16 may be operated by the hand lever 18 to bring the annular gear 12 to rest, thus producing an over drive. The driven shaft 5 will then be revolving twice as fast as the driving shaft 1.

While I have described my invention above in detail it is to be understood that many changes may be made therein without departing from the spirit of the same.

I claim:

1. A hydraulic torque converter provided with a torus chamber fluid circuit, having a rotary hydraulic impeller provided with a series of impeller blades in said circuit located radially on the impeller around its axis, a guide wheel having a series of fixed guide blades in said circuit coaxially adjacent to the impeller at the side of the radial impeller blades, a plurality of additional guide wheels having series of fixed blades, respectively, in said circuit forming channels in said circuit connected transversely of the outer periphery of the impeller, and a rotary runner cooperating with the impeller to receive liquid moved by the impeller blades, said runner having multiple series of rotatably featherable runner blades having between each adjoining series of them one of the said series of fixed guide blades, the rotatably featherable runner blades having a centrifugal counterweight outside of the periphery of said chamber for changing the angle of the same.

2. A hydraulic torque converter provided with a torus chamber fluid circuit, having a rotary hydraulic impeller provided with a series of impeller blades in said circuit located radially on the impeller around its axis, a guide wheel having a series of fixed guide blades in said circuit coaxially adjacent to the impeller at the side of the radial impeller blades, a plurality of additional guide wheels having series of fixed blades, respectively, in said circuit forming channels in said circuit connected together transversely of the outer periphery of the impeller, and a rotary runner cooperating with the impeller to receive liquid moved by the impeller blades, said runner having multiple series of rotatably featherable runner blades with connecting gears located between adjacent featherable blades.

3. A hydraulic torque converter provided with a torus chamber fluid circuit, having a rotary hydraulic impeller provided with a series of impeller blades in said circuit, located radially on the impeller around its axis, a guide wheel having a series of fixed guide blades in said circuit coaxially adjacent to the impeller at the side of the radial impeller blades, a plurality of additional guide wheels having series of fixed blades, respectively, in said circuit forming channels in said circuit connected together transversely of the outer periphery of the impeller, and a rotary runner cooperating with the impeller to receive liquid moved by the impeller blades, said runner having multiple series of rotatably featherable runner blades with connecting gears located between adjacent featherable blades, the rotatably featherable runner blades having a centrifugal counterweight outside the periphery of said chamber for changing the angle of the same.

4. A hydraulic torque converter provided with a torus chamber fluid circuit, having a rotary hydraulic impeller provided with a series of impeller blades in said circuit located radially on the impeller around its axis, a guide wheel having a series of fixed guide blades in said circuit coaxially adjacent to the impeller at the side of the radial impeller blades, a plurality of additional guide wheels having series of fixed blades, respectively, in said circuit forming channels in said circuit connected together transversely of the outer periphery of the impeller, and a rotary runner cooperating with the impeller to receive liquid moved by the impeller blades, said runner having multiple series of rotatably featherable runner blades with connecting gears located between adjacent featherable blades, stud shafts on which the gears are carried and a ring carrying said stud shafts.

5. A hydraulic torque converter provided with a torus chamber fluid circuit, having a rotary hydraulic impeller provided with a series of impeller blades in said circuit located radially on the impeller around its axis, a guide wheel having a series of fixed guide blades in said circuit coaxially adjacent to the impeller at the side of the radial impeller blades, a plurality of additional guide wheels having series of fixed blades, respectively, in said circuit forming channels in said circuit connected together transversely of the outer periphery of the impeller, and a rotary runner cooperating with the impeller to receive liquid moved by the impeller blades, said runner having multiple series of rotatably featherable runner blades with connecting gears between the same and stud shafts on which the gears are carried, the rotatably featherable runner blades having a centrifugal counterweight for changing the angle of the same and a ring carrying said stud shafts.

6. A hydraulic torque converter provided with a torus chamber fluid circuit, having a rotary hydraulic impeller provided with a series of impeller blades in said circuit located radially on the impeller around its axis, a guide wheel having a series of fixed guide blades in said circuit coaxially adjacent to the impeller at the side of the radial impeller blades, a plurality of additional guide wheels having series of fixed blades, respectively, in said circuit forming channels in said circuit connected together transversely of the outer periphery of the impeller, and a rotary runner cooperating with the impeller to receive liquid moved by the impeller blades, said runner having multiple series of rotatably featherable runner blades, the rotatably featherable runner blades having a centrifugal counterweight outside the periphery of said chamber for changing the angle of the same, said rotatably featherable runner blades being located in three featherable series which featherable series are on divergent shafts in the different series respectively, said series of featherable runner blades having between each adjoining series of them, respectively, one of said last mentioned series of fixed guide blades located in said circuit.

7. A hydraulic torque converter provided with a torus chamber fluid circuit, having a rotary hydraulic impeller provided with a series of impeller blades in said circuit located radially on the impeller around its axis, a guide wheel having a series of fixed guide blades in said circuit coaxially adjacent to the impeller at the side of the radial impeller blades, a plurality of additional guide wheels having series of fixed blades, respectively, in said circuit forming channels in said circuit connected together transversely of the outer periphery of the impeller, and a rotary runner cooperating with the impeller to receive liquid moved by the impeller blades, said runner having multiple series of rotatably featherable runner blades, the rotatably featherable runner blades having a centrifugal counterweight outside the periphery of said chamber for changing the angle of the same with the increasing speed of the runner, said rotatably featherable runner blades being located in three featherable series which series are on divergent shafts in the different series respectively, said series of featherable runner blades having between each adjoining series of them, respectively, one of said last mentioned series of fixed guide blades located in said circuit.

8. A hydraulic torque converter provided with a torus chamber fluid circuit, having a rotary hydraulic impeller provided with a series of impeller blades in said circuit located radially on the impeller around its axis, a guide wheel having a series of fixed guide blades in said circuit coaxially adjacent to the impeller at the side of the radial impeller blades, a plurality of additional guide wheels having series of fixed blades, respectively, in said circuit forming channels in said circuit connected together transversely of the outer periphery of the impeller, and a rotary runner cooperating with the impeller to receive liquid moved by the impeller blades, said runner having multiple series of rotatably featherable runner blades and centrifugally operated gearing comprising weights outside the periphery of said chamber on gear shafts constructed and arranged to adjust the position of the runner blades according to the speed of the runner, tending to oppose the position of the rotatably featherable runner blades in relation to the force of the hydraulic liquid tending to open the position of the rotatably featherable runner blades.

OLIVER W. ROOSEVELT.

References Cited in the file of this patent

UNITED STATES PATENTS

| Number | Name | Date |
|---|---|---|
| 1,900,120 | Lysholm et al. | Mar. 7, 1933 |
| 2,002,760 | Wilson | May 28, 1935 |
| 2,170,649 | Banker | Aug. 22, 1939 |
| 2,171,782 | Cotterman | Sept. 5, 1939 |
| 2,212,901 | Schneider | Aug. 27, 1940 |
| 2,235,673 | Dodge | Mar. 18, 1941 |
| 2,237,030 | Gathmann | Apr. 1, 1941 |
| 2,271,919 | Jandasek | Feb. 3, 1942 |
| 2,313,645 | Jandasek | Mar. 9, 1943 |
| 2,327,647 | Jandasek | Aug. 24, 1943 |
| 2,339,483 | Jandasek | Jan. 18, 1944 |
| 2,341,921 | Jandasek | Feb. 15, 1944 |
| 2,352,482 | Jandasek | June 29, 1944 |
| 2,389,174 | Whitworth | Nov. 20, 1945 |